United States Patent [19]

Bins

[11] 4,022,645

[45] May 10, 1977

[54] PROCESS FOR THE VULCANIZATION OF INNERTUBES, AND INNERTUBES VULCANIZED BY APPLYING SAID PROCESS

[75] Inventor: Cornelis Geerlof Bins, Heelsum, Netherlands

[73] Assignee: N.V. Rubberfabriek Vredestein, Netherlands

[22] Filed: July 3, 1975

[21] Appl. No.: 592,986

Related U.S. Application Data

[63] Continuation-in-part of Ser. No. 327,490, Jan. 29, 1973, abandoned.

[30] Foreign Application Priority Data

Feb. 2, 1972 Netherlands .................. 7201338

[52] U.S. Cl. .............................. 156/120; 152/349; 264/100; 264/236; 264/345; 264/347
[51] Int. Cl.² ........................................ B29H 5/01
[58] Field of Search ......... 264/347, 345, 236, 100; 156/118, 120; 152/348; 425/45

[56] References Cited

UNITED STATES PATENTS

| 545,118 | 8/1895 | Young | 264/236 |
|---|---|---|---|
| 596,819 | 1/1898 | Moseley | 264/236 |
| 1,340,704 | 5/1920 | Dech | 152/349 |
| 1,597,658 | 8/1926 | Fairchild | 425/45 |
| 1,852,085 | 4/1932 | Maynard | 264/236 |
| 2,214,903 | 9/1940 | Ickes | 264/100 |
| 2,294,621 | 9/1942 | Kraft | 425/45 |
| 2,592,724 | 4/1952 | O'Neil | 152/349 |
| 2,690,592 | 10/1954 | Schanz | 264/209 |

*Primary Examiner*—Jeffery R. Thurlow
*Attorney, Agent, or Firm*—McGlew and Tuttle

[57] ABSTRACT

Process for open vulcanization of innertubes wherein the completed green tube with valve and valve stem installed is folded and arranged on a surface with rods from about 13 to about 25 mm in diameter inserted in the folded ends. Air amounting to from about 7.5% to about 12.5% of the nominal fully inflated volume of the tube is injected and the thus-arranged and partially-inflated tube is exposed to open air or open steam curing at a temperature in the range of from about 150° to about 190° C. The resulting tube has edges and end folds of increased radius of curvature minimizing subsequent fatigue or flex cracking in service.

2 Claims, 4 Drawing Figures

PROCESS FOR THE VULCANIZATION OF INNERTUBES, AND INNERTUBES VULCANIZED BY APPLYING SAID PROCESS

RELATED APPLICATIONS

This application is a continuation-in-part of U.S. Pat. Ser. No. 327,490 filed Jan. 29, 1973, now abandoned.

BACKGROUND OF INVENTION

It is conventional to make innertubes in several ways. One method is to mold the tube under pressure in a heated mold. The resulting tube is smooth and has a circular cross section. Press molding of tubes is the best method but is much too expensive for the prices at which bicycle tubes commonly sell.

Another way of making innertubes involves extruding openend tubes which are either vulcanized on circular mandrels, or as disclosed U.S. Pat. No. 545,118, inside a circular or eliptical casing, after which the valve stems were installed and the ends of the tubes spliced to form a continuous inner tube. German Auslegeschrift 2,049,453 shows a minor variation in which a valve hole is punched and the ends of the length of tube-like extrudate are spliced after which the continuous tube is folded in half and laid on a surface for open vulcanization. The use of mandrels or casings to support the flat length of tube is too troublesome and expensive. The open-vulcanization of folded tubes produces innertubes having sharply and permanently-fixed edge folds and end folds which are objectionable to purchasers accustomed to the known quality of molded tubes and, moreover, are the loci of flex-, fatique- or oxidative-cracking in service.

SUMMARY OF INVENTION

The present invention is directed to an inexpensive process of open-vulcanization of innertubes which does not suffer from the problems of the prior art outlined above.

According to the invention, the spliced unvulcanized innertube, already provided with a valve stem and valve, is open-vulcanized, i.e. unconfined and unsupported except by a surface, and is preferably vulcanized in the flat, folded position with its valve stem located substantially centrally in respect of its tube width, and partially inflated and with rods inserted in the end folds.

By "free or open-vulcanization" is meant a vulcanization of a rubber article in which the article is not introduced into or positioned around a mold. In the process according to the invention the free vulcanization may efficiently take place by treating the material with steam or air in a vulcanization vessel.

During vulcanization, according to the process of the invention, the tube acquires edge-folds on either side of the valve on each longitudinal edge thereof and also end-folds at each end of what was originally the folded tube. However, the process ensures that these edge- and end-folds are of relatively larger radius of curvature than without inflation or rods, such that they are less subject to degradation in service. The edge-folds are just barely visible to a close observer between the tire rim and the tire during the mounting of the tube and one obtains a ready indication as to the correct position of the innertube on the rim. However, the purchaser may not be able to distinguish the tube from a mold vulcanized tube since the tube has a more rounded cross section and the end folds are of large curvature and not so prominent.

In the process of this invention, an excellent result is obtained if the green unvulcanized innertube, preferably after de-aerating to increase accuracy, is filled before vulcanization with a small, exactly dosed amount of air or other gaseous medium ranging from about 7.5% to about 12.5%, most preferably about 10%, of the nominal fully-inflated volume of the tube. If inflated below about 7.5% no visible results are achieved and if inflated more than about 12.5% difficulties in handling and placing the tubes on the curing surfaces are encountered.

If the green innertube after splicing is stored in the flat position without inflation and/or without rods in the end-folds, sharp creases and/or pleats will be visible and will be retained in the tube to some extent even after vulcanization and may give rise to fatigue cracks in use of the tube. It is preferred, therefore, to store the tubes in the inflated condition, with rods inserted in the end folds, and carefully arranged so as to lie as smoothly as possible.

As a result of the introduction of the dosed small amount of air the innertube will remain flatly positioned in appearance, but the air will accumulate near both edge- and end-folds as a result of the wieght of material of the central strip of the innertube. Thereby the folds obtain an internal radius of curvature of not too small dimensions, but nevertheless remain visible on the innertube after some inflation.

To increase the radius of curvature of the end-folds, it is necessary to insert rods or tubes transversily through the end-folds. The diameter of these rods should vary directly with the cross sectional area of the tube being vulcanized. It has been found satisfactory to utilize rods in the range of from about 13 to about 25 mm in diameter for the commonest sizes of bicycle innertubes ranging from 1 inch to 1.75 inches in cross sectional diameter.

BRIEF DESCRIPTION OF THE DRAWING

Figure 1:
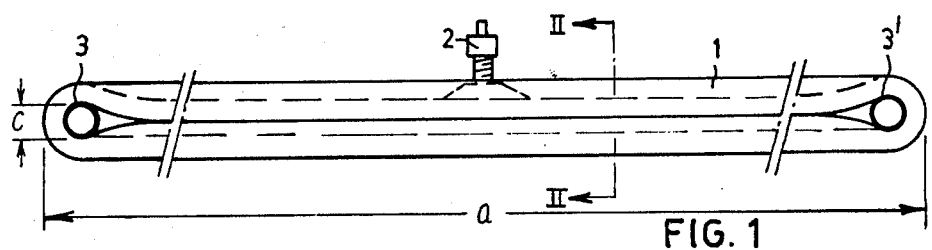
Figure 2:
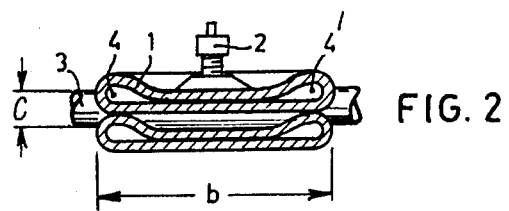
Figure 3:
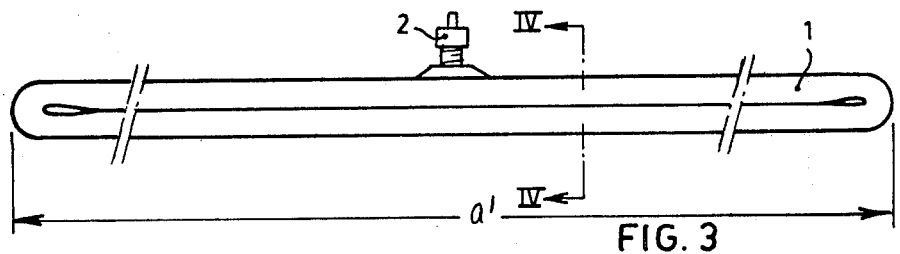

IN THE DRAWING:

FIG. 1 comprises a side view of a flatly positioned innertube which is vulcanized in accordance with the invention;

FIG. 2 is a cross sectional view of the tube shown in FIG. 1 taken along the line II—II;

FIG. 3 is a side elevation view similar to FIG. 1 showing the appearance of a tube vulcanized without inflation or rods.

Figure 4:
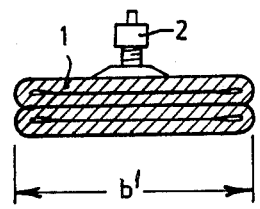

FIG. 4 is a section taken along the line IV—IV of FIG. 3.

GENERAL DESCRIPTION OF THE PREFERRED EMBODIMENTS

Referring to the drawings in particular the invention embodied therein comprises an innertube 1 which is partially filled with air and deposited in a flattened condition with its valve 2 oriented upwardly and centered. The process of the invention will be described in respect to the tube 1 by way of the following example:

EXAMPLE 1

For the manufacture of an innertube according to the invention having the size of 26 × 1⅜ inches a hose is extruded from a butylrubber mixture of a known composition, which has a wall thickness of 0.8 mm and a diameter of 24 mm. This hose is cut in the desired length of 1042 mm and is provided with a valve and joined on a butt splicer by which the ends of the hose are connected and an unvulcanized innertube is obtained.

Thereafter this innertube is de-aerated and then an amount of 100 cm³ of air is introduced into the tube through the valve at room temperature. As the volume of the tube in inflated condition is about 1 litre, the introduced amount of air thus amounts 10% of the total volume of the tube.

The tube provided with air is now folded and deposited in its horizontal condition with vertically-arranged folds one upon the other on a platform, directing the valve 2 upwardly and placing the doubled tube so that the valve is centrally located measured in both longitudinal as well as transverse directions.

At the same time rods 3, 3' 25 mm in diameter, are slipped into the folded ends in order to enlarge the radius of curvature of the fold. The air present in the tube uniformly distributes along the whole length of the tube, but the weight of the upper portion of the tube causes it to sag in the middle to some extent, which has a result that the air principally accumulates in two channels 4, 4' present along the sidewalls of the tube, so that no sharp seams are formed which might give rise, during the vulcanization process, to the origination of small radius edge-folds.

The platform on which a large number of innertubes is positioned next to each other, is now brought into a vulcanization vessel together with additional similar platforms. The vessel is brought thereafter to an internal working gauge pressure of 7 atmospheres by means of saturated steam, the temperature increasing thereby to about 170° C. After a residence time of about 10 minutes in the vessel the vulcanization process has taken place and the vessel, after venting the steam, can be opened. Hot air at the same temperature produces results equivalent to those with steam.

The flat vulcanized tube now measures about 37 mm wide $b$ and 970 mm long $a$ (in its doubled condition).

The thus prepared innertube shows two folds which are vulcanized in the tube along the whole circumference of the side-walls. The folds remain well visible if the innertube is inflated up to the condition in which it is mounted on the rim, but they disappear as a result of the deformation of the innertube during stretching of the sidewalls when the tube is inflated up to the condition in which it is present in the tire after fitting (thereby the diameter becomes about 34 mm).

FIGS. 3 and 4 show a corresponding tube in its non-inflated condition and without rods inserted in the end-folds. The much more sharply defined edge- and end-folds are clearly apparent.

While specific embodiments of the invention have been shown and described in detail to illustrate the application of the principles of the invention, it will be understood that the invention may be embodied otherwise without departing from such principles

What is claimed is:

1. In a process for the open vulcanization of innertubes, the improvement which comprises extruding a rubbery vulcanizable composition in the form of a tube, cutting the resulting extrudate to length, installing a valve stem and valve in said length, splicing the ends of said length to form an endless unvulcanized innertube, injecting, through said valve into said innertube, a gaseous medium amounting to a volume from about 7.5 to about 12.5% of the nominal inflated volume of the intended innertube, folding the innertube to form two superposed substantially horizontal lengths of the endless innertube interconnected by substantially vertically extending end folds at their opposite ends, and arranging the thus folded innertube, with the superposed lengths one above the other, on a supporting surface, inserting a respective rod, having a diameter of from about 13 to about 25 mm, transversely through each of said vertically extending end folds, and then open vulcanizing the thus arranged innertube at a temperature from about 150° to about 190° C.

2. The method as defined in claim 1 further characterized by said open-vulcanizing being carried out with steam.

* * * * *